(12) United States Patent
Landau

(10) Patent No.: US 12,073,030 B2
(45) Date of Patent: Aug. 27, 2024

(54) KEYBOARD SYSTEM FOR A TABLET, MOUNTABLE ON THE BACK OF THE TABLET

(71) Applicant: Yair Landau, Maor (IL)

(72) Inventor: Yair Landau, Maor (IL)

( * ) Notice: Subject to any disclaimer, the term of this patent is extended or adjusted under 35 U.S.C. 154(b) by 0 days.

(21) Appl. No.: 18/142,168

(22) Filed: May 2, 2023

(65) Prior Publication Data

US 2023/0359284 A1 Nov. 9, 2023

Related U.S. Application Data

(60) Provisional application No. 63/337,892, filed on May 3, 2022.

(51) Int. Cl.
*G06F 3/02* (2006.01)
*G06F 1/16* (2006.01)
*G06F 3/023* (2006.01)
*G06T 7/70* (2017.01)

(52) U.S. Cl.
CPC .......... *G06F 3/0236* (2013.01); *G06F 1/1673* (2013.01); *G06F 3/021* (2013.01); *G06F 3/0231* (2013.01); *G06T 7/70* (2017.01)

(58) Field of Classification Search
CPC ...... G06F 3/0236; G06F 1/1673; G06F 3/021; G06F 3/0231; G06F 3/0202; G06F 3/0216; G06F 1/1632; G06T 7/70
See application file for complete search history.

(56) References Cited

U.S. PATENT DOCUMENTS

| 6,297,752 | B1 * | 10/2001 | Ni | G06F 1/1626 400/489 |
| 2002/0118175 | A1 * | 8/2002 | Liebenow | G06F 1/1664 345/168 |
| 2004/0208681 | A1 * | 10/2004 | Dechene | G06F 1/169 400/472 |
| 2005/0104855 | A1 * | 5/2005 | Grossmeyer | G06F 3/0412 345/169 |
| 2007/0268261 | A1 * | 11/2007 | Lipson | G06F 1/1692 345/169 |

(Continued)

FOREIGN PATENT DOCUMENTS

GB 2592201 A * 8/2021 ........... G06F 3/0393

OTHER PUBLICATIONS

GB 2592201A, Touchscreen Interface (Year: 2021).*

*Primary Examiner* — Rodney Amadiz
(74) *Attorney, Agent, or Firm* — The Roy Gross Law Firm, LLC; Roy Gross

(57) ABSTRACT

Disclosed herein is a keyboard for a tablet. The keyboard is configured to be mounted on a back of a tablet and/or a back of a cover for tablet, and is functionally associable with the tablet. When properly mounted on the back of the tablet or on the back of the cover of the tablet inserted into the cover, the keyboard is configured to enable a user, holding the tablet with both hands and facing a screen of the table, to use a right hand to type on a first part of the keyboard and a left hand to type on a second part of the keyboard. The first part and the second part may constitute complementary parts of a keyboard whose keys are arranged in a mirror image of a standard computer keyboard or virtual smartphone keyboard. The keyboard is thereby configured to facilitate blind typing thereon.

17 Claims, 6 Drawing Sheets

(56) References Cited

U.S. PATENT DOCUMENTS

2011/0260982 A1* 10/2011 Trout ................... G06F 3/0489
                                                                        345/169
2012/0112931 A1*  5/2012 May ..................... G06F 1/1664
                                                                        341/22
2014/0198444 A1*  7/2014 Kwok .................. G06F 1/1624
                                                                       361/679.17

* cited by examiner

KEYBOARD SYSTEM FOR A TABLET, MOUNTABLE ON THE BACK OF THE TABLET

CROSS REFERENCE TO RELATED APPLICATIONS

This application claims the benefit of priority of U.S. Provisional Patent Application No. 63/337,892, filed May 3, 2022, the contents of which are all incorporated herein by reference in their entirety.

TECHNICAL FIELD

The present disclosure relates generally to keyboard for a tablet computer.

BACKGROUND

Tablet computers (also referred to simply as "tablets") are very popular in recent years due to their ease of use, light weight, and portability. Typically a tablet includes a thin, lightweight casing and a touch-screen (i.e. a touch-sensitive display), which occupies the bulk of the area of the front surface of the tablet. The touch-screen provides an easy user interface, which is particularly suited for viewing videos and photographs, listening to music, as well as surfing the web, and reading emails.

While tablets are convenient for media consumption, they are not ideal on their own for media creation, for example, word-processing and email composition. The reason is that the touch-screen provides the only keyboard inherent to the tablet: Being virtual, the on-screen keyboard is less conducive to rapid and accurate typing. An external (physical) keyboard is often used instead. This, however, affects the portability and ease-of-use of the tablet. In particular, many of these external keyboards may require placement on a flat surface (e.g. a table), thereby restricting use thereof, for example, when using public transport.

Thus, there is a need for improved keyboards for tablets.

SUMMARY

Aspects of the disclosure, according to some embodiments thereof, relate to keyboards for tablets.

According to an aspect of some embodiments, there is provided a keyboard for a tablet (i.e. tablet computer). The keyboard is functionally associable with a tablet. (By "functionally associable" what is meant is that at the very least text typed on the keyboard is, or may be, displayed on the screen of the tablet.) The keyboard is mounted, or mountable, on a back of the tablet, and/or on a back of a cover for tablet, so as to enable a user, who holds the tablet or the cover with both hands and faces a screen of the tablet, to use a right hand to type on a first part (e.g. a first unit of two separate units constituting the keyboard, or a first half of the keyboard when the keyboard is a single unit) of the keyboard and a left hand to type on a second part (e.g. a second unit of two separate units constituting the keyboard, or a second half of the keyboard when the keyboard is a single unit) of the keyboard. The first part and the second part may constitute complementary parts of a keyboard whose keys are arranged in a mirror image of a standard computer keyboard or virtual smartphone keyboard. Alternatively, the first part mat includes three columns of letters keys arranged in a first pattern, which is related to the arrangement of letter keys on a right half of a standard computer keyboard by about 90° clockwise rotation, and the second part may include three columns of letter keys arranged in a second pattern, which is related to the arrangement of letters keys on a left half of a standard computer keyboard by about 90° anti-clockwise rotation. The keyboard is thereby configured to facilitate blind typing thereon.

According to some embodiments of the keyboard, the first part and the second part constitute complementary parts of a keyboard whose keys are arranged in a mirror image of a QWERTY keyboard.

According to some embodiments of the keyboard, the first part is configured to enable the driver to type thereon using one or more of the second to fifth digits of the right hand, and the second part is configured to enable the driver to type thereon using one or more of the second to fifth digits of the left hand.

According to some embodiments, the first part and the second part constitute two separate, and separately mountable, units.

According to some embodiments of the keyboard, one or more letter keys on each of the first part and the second part have imprinted thereon a raised impression of the respective letter, thereby facilitating tactile identification of the letter key.

According to some embodiments of the keyboard, the keyboard further includes a wireless communication unit configured to communicate to the tablet when a key on the keyboard is pressed.

According to some embodiments of the keyboard, the wireless communication unit includes a Bluetooth antenna.

According to some embodiments of the keyboard, the first part and/or the second part include navigation and selection keys.

According to some embodiments of the keyboard, the keyboard includes a reduced set of keys as compared to a standard keyboard of a laptop computer.

According to some embodiments of the keyboard, the first part is or includes a touch surface and/or the second part is or includes a touch surface.

According to some embodiments of the keyboard, the first part and/or the second part include a touch pad providing computer mouse function.

According to some embodiments of the keyboard, the keyboard is configured to be removably mountable on the back of the tablet and/or on the back of the cover for the tablet.

According to some embodiments of the keyboard, the keyboard includes one or more magnets configured to allow removably attaching the keyboard to the back of the tablet.

According to some embodiments of the keyboard, the first part and the second part constitute, or form part of, a single unit.

According to some embodiments of the keyboard, the keyboard includes one or more rechargeable batteries for powering the keyboard.

According to some embodiments of the keyboard, the keyboard is built-in into the back of the tablet.

According to some embodiments of the keyboard, the keyboard is built-in to the back of the cover for the tablet.

According to an aspect of some embodiments, there is provided a keyboard system for a tablet. The keyboard system includes a keyboard and a processor(s). The keyboard is configured is mounted, or mountable, on a back of a tablet and/or on a back of a cover for tablet. The processor(s) is configured to, when the keyboard is mounted on the back of the tablet, or on the back of the cover of the tablet with the keyboard inserted into the cover, have the tablet to display on a screen thereof a graphical representation of the keyboard, which is about actual size and about aligned with the keyboard.

According to some embodiments of the keyboard system, the processor(s) is further configured to, when a key on the keyboard is pressed, have a graphical representation of the key highlighted.

According to some embodiments of the keyboard system, the processor(s) is further configured to receive values (e.g. measured values) of distances between the keyboard and edges and/or corners of the tablet, or the cover, and, based thereon, position and orient the graphical representation of the keyboard on the screen of the tablet, such that the graphical representation is aligned with the keyboard.

According to some embodiments of the keyboard system, the keyboard includes a plurality of visual markings. The processor(s) is further configured to receive values of distances from the edges of the tablet, or the cover, to the visual markings, and, based thereon, position and orient the graphical representation of the keyboard on the screen of the tablet, such that the graphical representation is aligned with the keyboard.

According to some embodiments of the keyboard system, the processor(s) is configured to (i) receive one or more photos of the back of the tablet with the keyboard mounted thereon, or the back of the cover with the tablet inserted thereinto and the keyboard mounted thereon, and (ii) and position and orient the graphical representation of the keyboard on the screen of the tablet, such that the graphical representation is aligned with the keyboard, by executing an image recognition algorithm.

According to some embodiments of the keyboard system, the processor(s) is included in the tablet.

According to some embodiments of the keyboard system, the processor(s) include a plurality of processors with some of the processors being included on the tablet and some of the processors being in the cloud (e.g. implemented in a cloud server). According to some such embodiments, the image recognition algorithm, described above, may be implemented in the cloud.

According to some embodiments of the keyboard system, the first part and the second part constitute complementary parts of a keyboard whose keys are arranged in a mirror image of a QWERTY keyboard.

According to some embodiments of the keyboard system, the first part is positioned and configured to enable the user to type thereon using one or more of the second to fifth digits of the right hand, and the second part is positioned and configured to enable the driver to type thereon using one or more of the second to fifth digits of the left hand.

According to some embodiments of the keyboard system, the first part and the second part constitute two separate, and separately mountable, units.

According to some embodiments of the keyboard system, one or more letter keys on the keyboard have imprinted thereon a raised impression of the respective letter, thereby facilitating tactile identification of the letter key.

According to some embodiments of the keyboard system, the keyboard further includes a wireless communication unit configured to communicate to the processor(s) when a key on the keyboard is pressed.

According to some embodiments of the keyboard system, the wireless communication unit includes a Bluetooth antenna.

According to some embodiments of the keyboard system, the keyboard includes navigation and selection keys.

According to some embodiments of the keyboard system, the keyboard includes a reduced set of keys as compared to a standard keyboard of a laptop computer.

According to some embodiments of the keyboard system, the keyboard is or includes a touch surface.

According to some embodiments of the keyboard system, the keyboard is configured to be removably mountable on the back of the tablet and/or on the back of the cover for the tablet.

According to some embodiments of the keyboard system, the keyboard includes one or more magnets configured to allow removably attaching the keyboard to the back of the tablet.

According to some embodiments of the keyboard system, the keyboard includes one or more rechargeable batteries for powering the keyboard.

According to some embodiments of the keyboard system, the keyboard is built-in into the back of the tablet.

According to some embodiments of the keyboard system, the keyboard is built-in to the back of the cover for the tablet.

According to an aspect of some embodiments, there is provided a tablet including, built-in into a back of the tablet, a keyboard such as the keyboards described above.

According to an aspect of some embodiments, there is provided a cover for a tablet including, built-in into a back of the cover for the tablet, a keyboard such as the keyboards as described above.

According to an aspect of some embodiments, there is provided a computer-readable storage medium having stored thereon software instructions (e.g. of a downloadable app) executable by a processor(s) of a tablet, which cause the tablet—in communication with a keyboard mounted on a back of the tablet or on a back of a cover for the tablet with the tablet inserted into the cover—to display on a screen of the tablet a graphical representation of the keyboard. The graphical representation is actual size and is aligned with the keyboard.

According to some embodiments of the computer-readable storage medium, the software instructions further cause the tablet, when a key on the keyboard is pressed, to highlight a graphical representation of the key.

According to some embodiments of the computer-readable storage medium, the software instructions further cause the processor(s), on receipt of values specifying distances from edges of the tablet, or the cover, to prespecified locations (e.g. designated by visual markings) on the keyboard (i.e. locations whose coordinates in a coordinate system of the keyboard is known), position and orient the graphical representation of the keyboard on the screen of the tablet, such that the graphical representation is aligned with the keyboard, based on the received values.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

Unless specifically stated otherwise, as apparent from the disclosure, it is appreciated that, according to some embodiments, terms such as "processing", "computing", "calculating", "determining", "estimating", "assessing", "gauging" or the like, may refer to the action and/or processes of a computer or computing system, or similar electronic computing device, that manipulate and/or transform data, represented as physical (e.g. electronic) quantities within the computing system's registers and/or memories, into other data similarly represented as physical quantities within the computing system's memories, registers or other such information storage, transmission or display devices.

Embodiments of the present disclosure may include apparatuses for performing the operations herein. The apparatuses may be specially constructed for the desired purposes or may include a general-purpose computer(s) selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method(s). The desired structure(s) for a variety of these systems appear from the description below. In addition, embodiments of the present disclosure are not described with reference to any particular programming language. It will be appreciated that a variety of programming languages may be used to implement the teachings of the present disclosure as described herein.

Aspects of the disclosure may be described in the general context of computer-executable instructions, such as program modules, being executed by a computer. Generally, program modules include routines, programs, objects, components, data structures, and so forth, which perform particular tasks or implement particular abstract data types. Disclosed embodiments may also be practiced in distributed computing environments where tasks are performed by remote processing devices that are linked through a communications network. In a distributed computing environment, program modules may be located in both local and remote computer storage media including memory storage devices.

BRIEF DESCRIPTION OF THE FIGURES

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not drawn to scale. Moreover, two different objects in the same figure may be drawn to different scales. In particular, the scale of some objects may be greatly exaggerated as compared to other objects in the same figure.

In the figures.

DETAILED DESCRIPTION

Figure 1A:
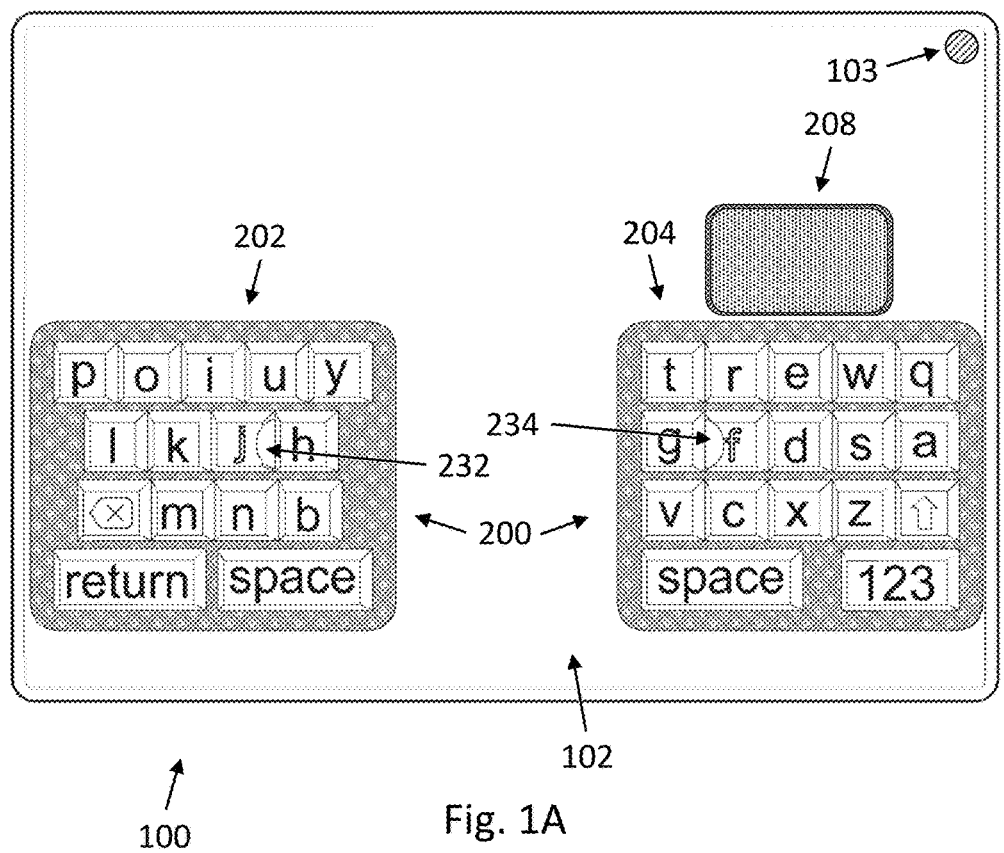
FIG. 1A presents a schematic back view of a tablet and a keyboard installed on the back of the tablet, according to some embodiments.

The principles, uses, and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

In the description and claims of the application, the words "include" and "have", and forms thereof, are not limited to members in a list with which the words may be associated.

As used herein, the term "about" may be used to specify a value of a quantity or parameter (e.g. the length of an element) to within a continuous range of values in the neighborhood of (and including) a given (stated) value. According to some embodiments, "about" may specify the value of a parameter to be between 80% and 120% of the given value. For example, the statement "the length of the element is equal to about 1 m" is equivalent to the statement "the length of the element is between 0.8 m and 1.2 m". According to some embodiments, "about" may specify the value of a parameter to be between 90% and 110% of the given value. According to some embodiments, "about" may specify the value of a parameter to be between 95% and 105% of the given value.

As used herein, according to some embodiments, the terms "substantially" and "about" may be interchangeable.

As used herein, the pronoun "they" may be used as a third-person, singular pronoun when the gender is unspecified. Similarly, derivatives of "they", particularly, "their" and "themself" may be used as the genderless equivalents of "his/hers" and "himself/herself", respectively.

As used herein, the term "fingers" is reserved for the index, middle, ring, and little fingers, and, in particular, does not refer to any of the thumbs. The term "hand digits" may be used to refer to both the fingers and the thumb.

As used herein, here the terms "front" and "back", with reference to a tablet, are employed in the same manner that a user (such as the user of FIG. 2B) would employ the terms. Thus, the front of a tablet refers to the part of the tablet, which includes the touch-screen (referable to simply as "screen") of the tablet, that is, the part of the tablet which faces the user—when the user is looking at the screen. The back of the tablet refers to the part of the tablet, which is hidden-from-view from the user when the user is looking at the screen.

The present application advantageously discloses a keyboard for a tablet, or a similar mobile computing device, which is not cumbersome, easy to carry, and does not require a flat surface for placement of the keyboard, being thereby convenient for use, for example, in public transport.

According to an aspect of some embodiments, there is provided a keyboard for a tablet (or a similarly shaped mobile computing device). The keyboard may be mountable on the back of the tablet, that is, the surface of the tablet that faces away from the user and which the user does not see when looking at the screen of the tablet. Additionally, or alternatively, the keyboard may be mountable on a back of a case (i.e. a cover) for a tablet. The keyboard is configured to allow a user to type thereon using both hands while holding the tablet or the case (with the tablet being inserted into the case).

According to some embodiments, the keyboard further includes a wireless communication unit(s) (e.g. a Bluetooth antenna(s)) configured to functionally associate the keyboard with a tablet.

According to some embodiments, the keyboard may be constituted by a single unit. According to some embodiments, the keyboard may include a plurality of units (i.e. two or more boards, which may include different keys). According to some such embodiments, the keyboard may be constituted by two units: A first unit may be positioned, or positionable, on the left side of the tablet (on the back thereof), and a second unit may be positioned, or positionable, on the right side of the tablet (on the back thereof). The first unit may be positioned, or positionable, such as to allow a user to type thereon using one or more of the index, middle, ring, and little fingers of the right hand. Similarly, the second unit may be positioned, or positionable, such as to allow a user to type thereon using one or more of the index, middle, ring, and little fingers of the left hand.

According to some embodiments, the keyboard may include all the keys, or substantially all the keys, as on a standard keyboard of a laptop computer or a desktop computer.

According to some embodiments, the keyboard may include a reduced set of keys, as in a virtual keyboard of a tablet or a smartphone.

According to some embodiments, the keyboard may be a touch keyboard (i.e. constituted by one or more touch surfaces).

According to some embodiments, one or more letter keys may have imprinted thereon a raised impression of the respective letter, thereby facilitating tactile identification of the letter key.

Several different keyboard layouts (i.e. arrangement of the keys on the keyboard)—relevant for each of the above-described keyboards—are disclosed. According to some embodiments, the disclosed keyboard layouts allow a user to blindly type on the keyboard, while looking at the screen of the tablet (and therefore facing away from the back of the tablet and the keyboard), based on visual memory of a standard computer keyboard or a virtual tablet keyboard, or tactile memory of a standard computer keyboard. Thus, advantageously, these keyboard layouts require little to no memorization of the arrangement of the keys on the part of the user, thereby facilitating blind typing on the keyboard by the user.

According to some embodiments, the keys on the keyboard may be arranged in a mirror image of a standard computer keyboard or virtual keyboard tablet, the keyboard being thereby configured to allow a user to blindly type thereon, while facing the screen of the tablet, based on visual memory of a standard computer keyboard or a virtual tablet keyboard. According to some such embodiments, the keys are arranged in a mirror image of a QWERTY keyboard.

According to some embodiments, a first part of the keyboard, or a first unit of the keyboard when the keyboard includes two units, includes three columns of letters keys arranged in a first pattern, which is related to the arrangement of letter keys on a right half of a standard computer keyboard by about 90° clockwise rotation. A second part of the keyboard, or a second unit of the keyboard when the keyboard includes two units, and the includes three columns of letter keys arranged in a second pattern, which is related to the arrangement of letters keys on a left half of a standard computer keyboard by about 90° anti-clockwise rotation, The keyboard is thereby configured to facilitate blind typing thereon, while looking at the screen of the tablet, based on tactile memory of a standard computer keyboard.

According to an aspect of some embodiments, there is provided a tablet, which includes a keyboard on the back of the tablet. According to some embodiments, the keyboard is built-in into the tablet. The keyboard is configured to allow a user to type thereon using both hands while holding the tablet. The keyboard may include an arrangement of keys as described above.

According to an aspect of some embodiments, there is provided a case for a tablet, which includes a keyboard on the back of the case. According to some embodiments, the keyboard is built-in into the case. The keyboard is configured to allow a user to type thereon using both hands while holding the case with the tablet being inserted into the case. The keyboard may include an arrangement of keys as described above.

According to an aspect of some embodiments, the disclosed keyboards may be used in conjunction (i.e. together) with an app, which is installable on a tablet. The app may be configured to generate a graphical representation of the keyboard on the screen of the tablet when a user is typing on the keyboard. The graphical representation of the keyboard may be actual size and aligned with the (actual) keyboard on the back of the tablet, such that the graphical representation of each key is aligned with the (actual) key. According to some embodiments, when pressing a key, the visual representation thereof becomes highlighted.

According to an aspect of some embodiments, there is provided a mobile computational device similar in shape to a tablet but differing from a tablet in including a screen, which is not a touch screen. The device includes, built-in into the back thereof, a keyboard as described above. The keyboard may be endowed with mouse capabilities, e.g. by including a touch pad or a pointing stick. The keyboard may be used in conjunction with an app as described above, which is configured to generate a graphical representation of the keyboard on the screen.

Figure 1B:
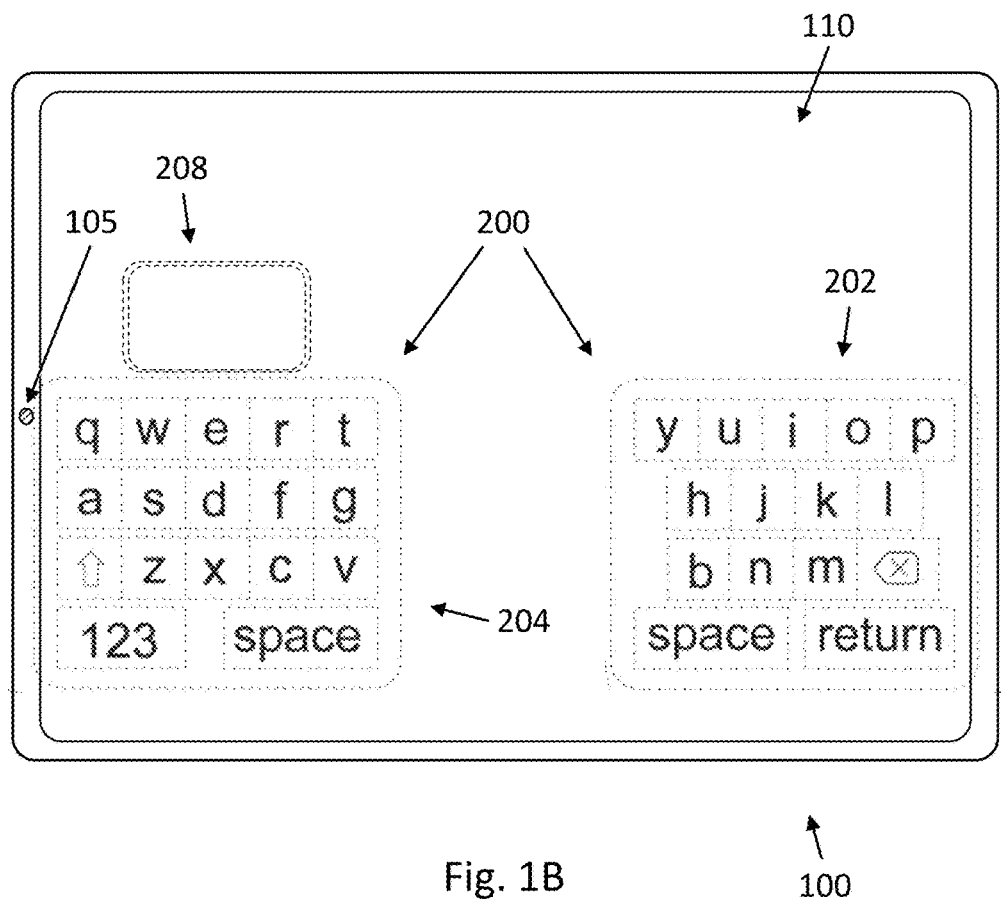
FIG. 1B presents a schematic front view of the tablet of FIG. 1A with the keyboard installed thereon, according to some embodiments. Being installed on the back of the tablet, the keyboard should not be visible in a front view but is nevertheless indicated (by a dashed outline) in order to facilitate the description.

Referring to FIGS. 1A and 1B, FIGS. 1A and 1B schematically depict a tablet keyboard 200 mountable on a tablet, according to some embodiments. FIG. 1A presents a schematic back view of a tablet 100 with keyboard 200 positioned on a back (i.e. backside) 102 of tablet 100, according to some embodiments. According to some embodiments, keyboard 200 may be installable on back 102. According to some embodiments, keyboard 200 may be removably installable on back 102 (e.g. using a magnet(s)). According to some such embodiments, keyboard 200 is a wireless keyboard. In particular, keyboard 200 may include a wireless communication unit(s) (e.g. a Bluetooth antenna(s)), which is used to functionally associate keyboard 200 with tablet 100 (at least in the sense that text typed on keyboard 200 is, or may be, displayed on the screen of tablet 100).

According to some alternative embodiments, keyboard 200 may be built-in into back 102. That is, in such embodiments, tablet 100 may be manufactured with keyboard 200 included on back 102.

According to some embodiments, and as depicted in FIG. 1A, keyboard 200 includes a first unit 202 (i.e. a first part of keyboard 200 which constitutes a separate and, according to some embodiments, independently mountable first keyboard unit) positioned on the left side of back 102, and a second unit 204 (i.e. a second part of keyboard 200 which constitutes a separate and, according to some embodiments, independently mountable second keyboard unit) positioned on the right side of back 102. (According to some alternative embodiments, keyboard 200 may include more than two units.) According to some embodiments, units 202 and 204 are removably attachable onto the back 102. According to some such embodiments, the precise positioning of units 202 and 204 on back 102 may be chosen by the user, e.g. according to their comfort, thereby accommodating differences between users in hand anatomy, such as the size of the hands, and the length of the fingers. According to some embodiments, each of units 202 and 204 may be laterally rectangular According to some embodiments, the front surfaces of each of units 202 and 204 may include protruding (i.e. slightly projecting from the surface) keys, as depicted in the Figures, flat keys, or may include a touch surface. According to some embodiments, each of units 202 and 204 may be flexible (e.g. similarly to a roll up keyboard).

FIG. 1B presents a front view of tablet 100, according to some embodiments. Even though units 202 and 204 would not be visible to a user looking at a screen 110 (i.e. facing screen 110) of tablet 100, they are nevertheless outlined (in a dashed line) to facilitate the description. The front surfaces of each of first unit 202 and second unit 204 face away from the user (since first unit 202 and second unit 204 are attached on the back surfaces thereof to the back of tablet 100). In particular, the keys on first unit 202 and second unit 204 face away (e.g. protrude away) from the user.

According to some embodiments, and as depicted in FIGS. 1A and 1B, keyboard 200 may be used in conjunction with a touch surface 208, which provides the same functionality as a touchpad of a laptop computer. Even though touch surface 208 would not be visible to a user looking at a screen 110 of tablet 100, it is nevertheless outlined (in a dashed line) to facilitate the description. According to some embodiments, particularly, embodiments, wherein keyboard 200 is removably installable on back 102, touch surface 208 may also be removably installable on back 102. According to some such embodiments, touch surface 208 may include a wireless communication unit (e.g. a Bluetooth antenna), which is used to functionally associate touch surface 208 with tablet 100. According to some embodiments, wherein keyboard 200 is a single unit, the single unit may include touch surface 208. According to some embodiments, and as depicted in FIG. 1A, wherein keyboard 200 includes two separate units, touch surface 208 may be included in one of the two units (e.g. second unit 204). Alternatively, according to some embodiments, particularly embodiments wherein keyboard 200 is built-in into back 102, touch surface 208 may also be built-in into back 102.

Figure 3A:
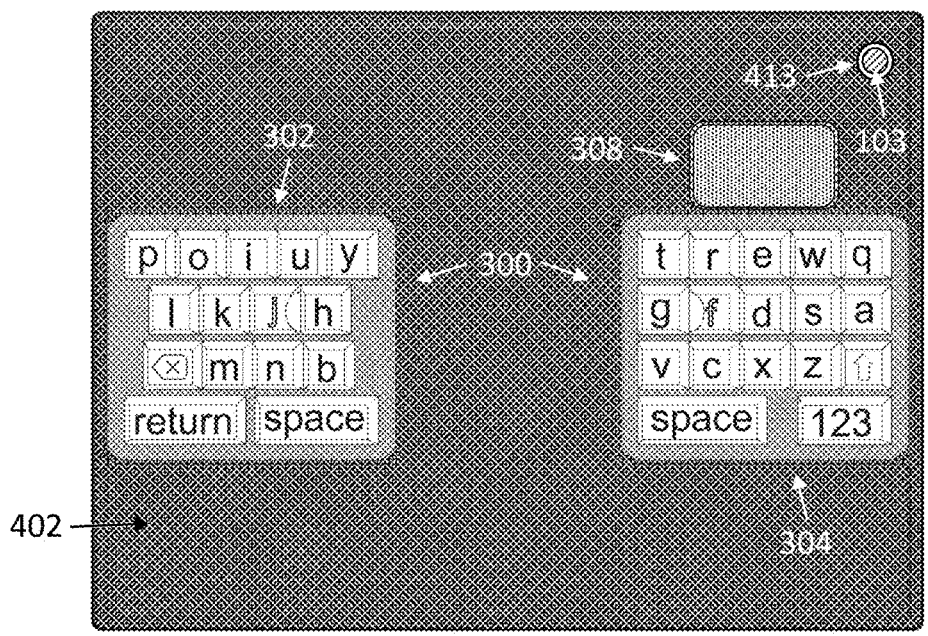
FIG. 3A presents a schematic back view of a cover of a tablet, a tablet (only a back camera thereof is visible) inserted into the cover, and a keyboard, which is installed on the back of the cover, according to some embodiments.

Additionally, or alternatively, according to some embodiments, keyboard 200 may include a pointing stick, such as the pointing stick shown in FIG. 3A.

Also indicated in FIGS. 1A and 1n FIG. 1B are a back camera 103 and a front camera 105, respectively, which tablet 100 may include, according to some embodiments thereof.

According to some embodiments, units 202 and 204 may be removably attached to the back of tablet 100. For example, each of units 202 and 204 may include a magnet on the respective back surface thereof. As another example, a Velcro loop surface may be included on, or attached to, the back surface of first unit 202 and a corresponding Velcro hook surface may be attached to the left side of back 102. Similarly, a Velcro loop surface may be included on, or attached to, the back surface of second unit 204 and a corresponding Velcro hook surface may be attached to the right side of back 102.

Magnets and Velcro each allow easily changing and adjusting the positions of each of units 202 and 204. Advantageously, this may allow a user to attach the units according to their preference/comfort.

Considering both first unit 202 and second unit 204 together, with second unit 204 positioned to the right of first unit 202, as seen in FIG. 1A, the two units constitute complementary parts of a keyboard whose keys are arranged in a mirror image of a QWERTY keyboard, such as the virtual QWERTY keyboard employed on smartphones and tablets. More precisely, the positions of the keys are inverted relative to the positions thereof in a QWERTY keyboard, such that the letter p' is positioned where the letter 'q' would be positioned on the QWERTY keyboard (i.e. the letters p' and 'q' are switched), the letter 'o' is positioned where the letter 'w' would be positioned on the QWERTY keyboard (i.e. the letters 'o' and 'w' are switched), the letter T is positioned where the letter 'f' would be positioned on the QWERTY keyboard (i.e. the letters T and 'f' are switched), and so on.

According to some embodiments, second unit 204 and/or first unit 202 may include a '123' key, as in some virtual keyboards on smartphones. To revert to a numbers and symbols keyboard layout, the '123' key may be pressed. Pressing again the '123' key switches back to the letters keyboard layout.

Alternatively, according to some embodiments, not depicted in the Figures, keyboard 200 may additionally include ten number keys (i.e. 0-9 keys), and optionally, punctuation keys. According to some such embodiments, not depicted in the Figures, keyboard 200 may include a full set of keys as a in keyboard of a laptop or a desktop computer.

Figure 2A:
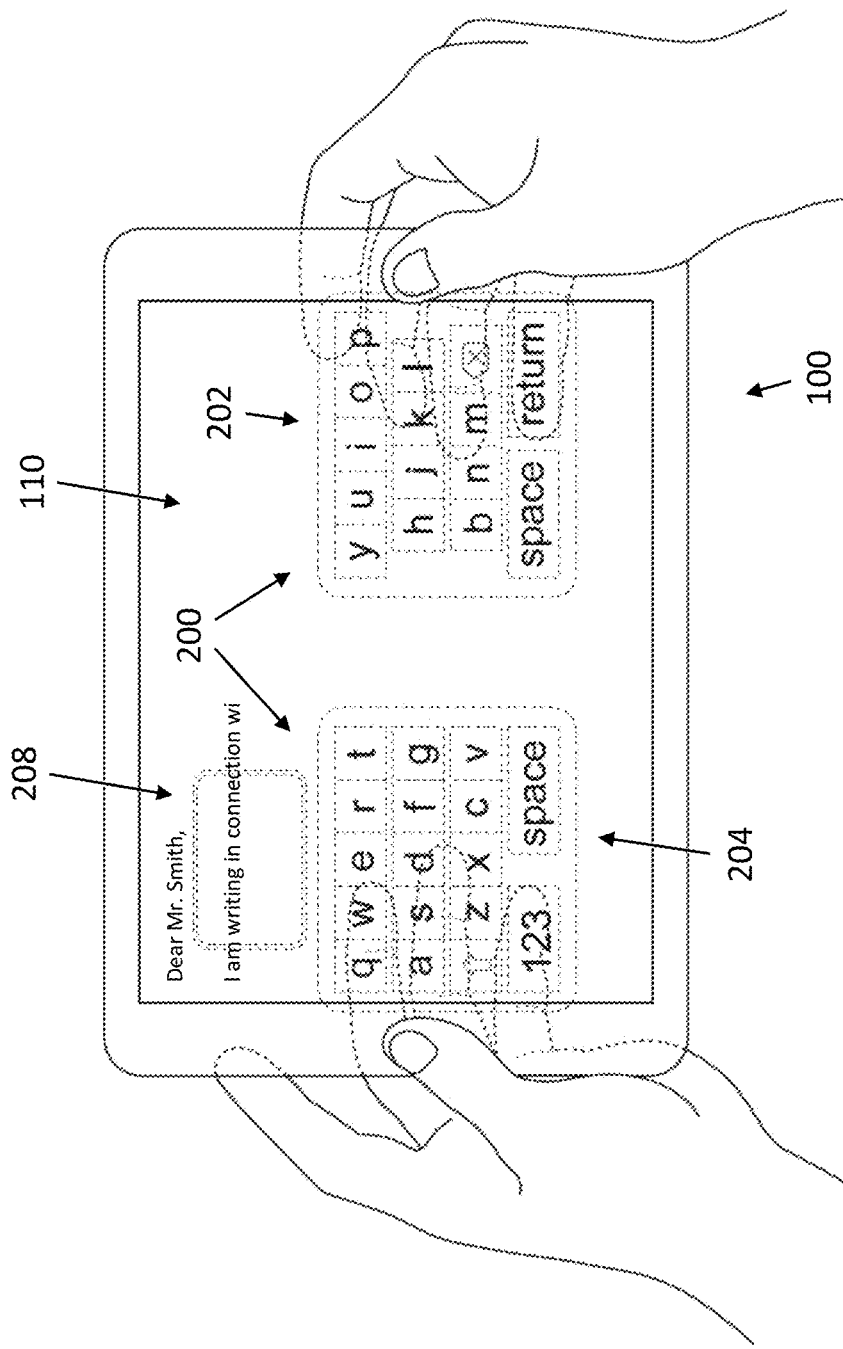
FIG. 2A presents a schematic front view of the tablet and keyboard of FIG. 1A with the tablet being held by a user (only the hands of the user are shown) in a manner which allows the user to type on the keyboard and simultaneously look at the screen of the tablet, according to some embodiments.
Figure 2B:
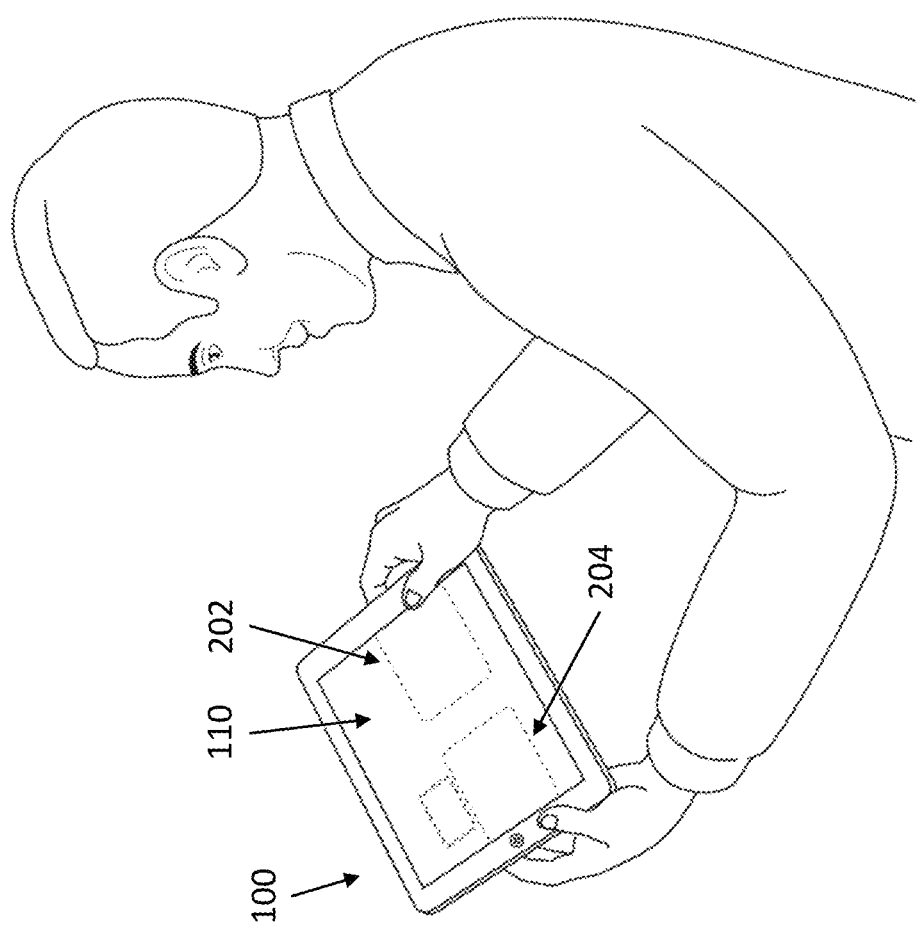
FIG. 2B presents a full, perspective view of the user a of FIG. 2A holding the tablet and typing on the keyboard, according to some embodiments.

Referring also to FIGS. 2A and 2B, a user is shown holding tablet 100 (without any external support) and typing on keyboard 200, which is installed on tablet 100, according to some embodiments. The text typed by the user is displayed on screen 110 on a top part of screen 110. (The typed text is not shown in FIG. 2B.) In FIG. 2A only the hands of the user are shown.

In use, and as shown in FIG. 2A, the user employs their right hand to type on first unit 202 and their left hand to type on second unit 204. (In the following, first unit 202 may also be referred to as "right hand unit" and second unit 204 may also be referred to as "left hand unit".) The user is shown typing blindly on the keyboard 200 with the keys facing away from the user. However, due to the layout of the keys on keyboard 200 being a mirror of the layout of the keys on a QWERTY keyboard (when keyboard 200 is properly mounted on back 102 as depicted in FIGS. 1A-2A), the keys are arranged in a QWERTY keyboard layout relative to the user (up to the keyboard being partitioned into two units (keyboard units), which are spaced apart).

That is, when properly mounted on a tablet, each key on keyboard 200 is positioned where the user expects to find the key based on a mental image they have of a keyboard. This mental image is drawn from visual memory, and, as such, corresponds to the type of keyboard the user uses daily. In the embodiments depicted in FIGS. 1A-2A, it is assumed that the user employs a QWERTY keyboard on a daily basis, such as a virtual QWERTY keyboard on their smartphone, the QWERTY keyboard of their laptop computer, and/or the QWERTY keyboard of their desktop computer.

According to some embodiments, and as depicted in FIGS. 1A-2B, touch surface 208 may be positioned adjacently to, and above, second unit 204, thereby allowing to use the index finger and the middle finger of the left hand of the user to operate touch surface 208. Alternatively, according to some embodiments, not depicted in FIGS. 1A-2B, touch surface 208 may be positioned adjacently to, and above, first unit 202.

While keyboard 200 is depicted as configured for users who in everyday life use a QWERTY keyboard, it is to be understood that the scope of the disclosure is not limited in this respect. Indeed, the layouts of the tablet keyboards of the present disclosure may be based on alternatives to the QWERTY keyboard layout, such as, for example, the Dvorak and Colemak keyboard layouts with the key arrangement of the respective keyboard being a mirror image thereof, in the same way as explained above per keyboard 200.

Further, the layouts of the tablet keyboards of the present disclosure may be based on keyboard layouts designed for languages other than English. Non-limiting examples include the Latin alphabet AZERTY keyboard layouts and QWERTZ keyboard layouts, which are employed by French speakers and in central Europe, respectively. Again, the guiding principle is the mirror inversion of a standard keyboard. Thus, for a tablet keyboard based on an AZERTY keyboard, when the two units thereof are considered side-by-side, with the left hand unit positioned to the right of the right hand unit, the letters 'a' and 'ID' are "switched", similarly the letters, 'z' and 'o' are "switched", and so on.

Finally, it is emphasized that the tablet keyboards of the present disclosure are not limited to Latin alphabet-based keyboards. Using the guiding principle of the mirror inversion of a keyboard (as described above with respect to a QWERTY-based keyboard), the tablet keyboards of the present disclosure may be adapted to essentially any language, whether Russian, Arabic, Korean, or even Chinese, to name a few non-limiting examples.

Different embodiments of keyboard 200 may differ from one another in the sizes thereof, the sizes of the keys, and the spacings between the keys. According to some embodiments, keyboard 200 may be manufactured in different sizes and a user may select the size of the keyboard (e.g. of units 202 and 204 in embodiments wherein keyboard 200 includes a pair of units), which is most convenient for them. For example, a user whose hands are small may prefer to use a keyboard with smaller keys, which are more densely arranged.

Further, taking into account the fact that tablets come in a variety of sizes (e.g. 8 inch, 10, inch, 12 inch), it is contemplated that different specific embodiments of keyboard 200 may be configured for use with tablets of different sizes, respectively.

According to some embodiments, and as depicted in FIG. 1A, the top surface of each of the 'f' and 'j' keys may have imprinted thereon a raised impression of the respective letter.

The raised impressions allow tactile recognition of the keys, thereby serving the same function as the ridges on the 'f' and 'j' keys on a QWERTY laptop keyboard or desktop computer keyboard. According to some embodiments, not depicted in the figures, each letter key on the keyboard may have imprinted thereon the letter, thereby facilitating tactile identification of the key.

According to some embodiments, and as depicted in FIG. 1A, each of the 'f' and T keys may be notched, so as to allow a user to easily distinguish these keys from the rest of the keys and thereby confirm or establish the positionings of their fingers on each of units 202 and 204. According to some embodiments, and as depicted in FIGS. 1A, the T key may include a notch 232 (i.e. a rounded depression) on the right edge thereof and the 'f' key may include a notch 234 on the left edge thereof.

According to some embodiments, keyboard 200 may be used in conjunction with a keyboard-associated app, which is configured to allow a user to lock (i.e. disable) keyboard 200.

According to some embodiments, keyboard 200 may be used in conjunction with a keyboard-associated app (e.g. downloadable to the tablet), which is configured to allow reprogramming the keys of keyboard 200. That is, the app may be configured to allow a user to assign a letter (and number or symbol) to each key. According to some such embodiments, the keys may be smooth and 3D stickers (i.e. bulging stickers), shaped as letters, numbers, and/or symbols, may be attached to the keys to facilitate tactile recognition of the keys.

Figure 3B:
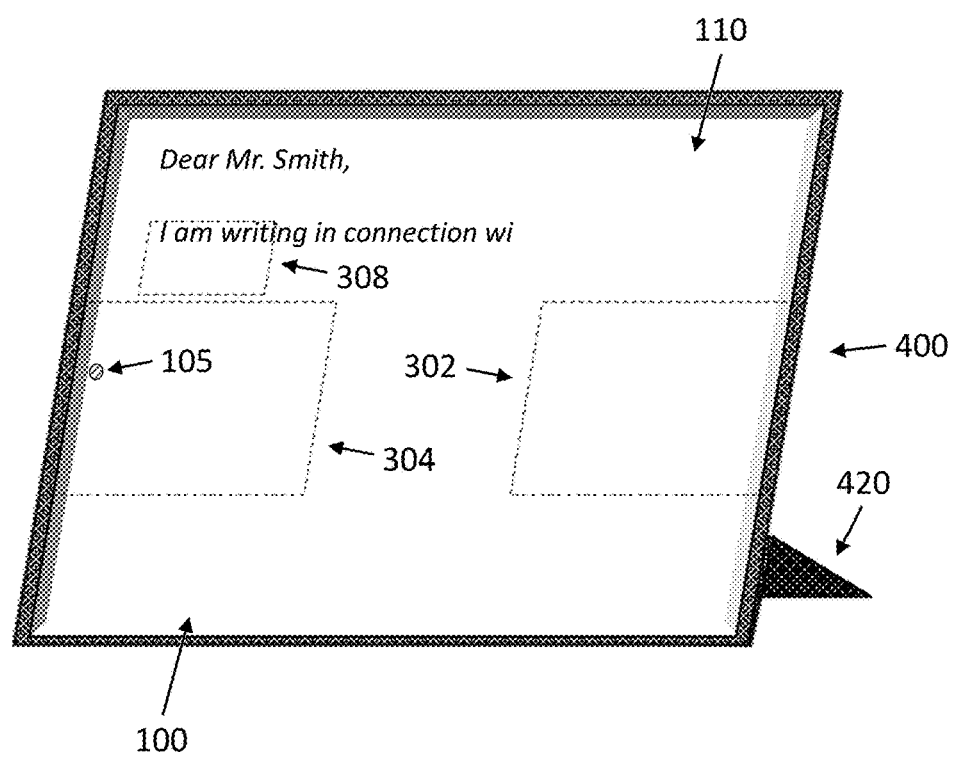
FIG. 3B presents a schematic front view of the cover of FIG. 3A with the tablet inserted thereinto, and the keyboard installed on the back of the cover, according to some embodiments. Being installed on the back of the cover, the keyboard should not be visible in a front view of the cover but is nevertheless indicated (by a dashed outline) in order to facilitate the description.

Referring to FIGS. 3A and 3B, FIGS. 3A and 3B schematically depict a tablet keyboard 300, which is mountable on a cover (e.g. protective case) for a tablet, according to some embodiments. FIG. 3A presents a schematic back view of a cover 400 for a tablet with keyboard 300 positioned on a back (i.e. backside) 402 of cover 400, according to some embodiments. Cover 400 has tablet 100 inserted thereinto, as indicated by back camera 103 being visible through a camera hole 413 in cover 400. Keyboard 300 may be similar to keyboard 200. According to some embodiments, keyboard 300 corresponds to specific embodiments of keyboard 200, wherein keyboard 200 may be additionally installable (e.g. removably installable) on a back of a cover for a tablet (as well as on the back of a tablet). According to some embodiments, keyboard 300 may be removably installable on a cover using Velcro. In such embodiments, keyboard 300 may include a wireless communication unit(s) (e.g. a Bluetooth antenna(s)), which is used to functionally associate keyboard 300 with tablet 100. Alternatively, according to some embodiments, keyboard 300 may be built-in into back 402. That is, in such embodiments, cover 400 may be manufactured with keyboard 300 included on back 402.

As a non-limiting example, keyboard 300 is shown as including two units: a first unit 302 and a second unit 304. First unit 302 and second unit 304 may be similar to first unit 202 and second unit 204, respectively. Also indicated is a touch surface 308, which may be similar to touch surface 208.

FIG. 3B presents a perspective view of cover 400 with tablet 100 inserted thereinto, according to some embodiments. As a non-limiting example, cover 400 is depicted as including a foldable, front flap 420. According to some such embodiments, when folded, front flap 420 may support back 402, particularly when tablet 100 is attached to back 402, such that tablet 100 is held substantially upright. It is noted that when cover 400 is placed on a table, at the above-described configuration (i.e. such that tablet 100 is held substantially upright), a user seated in front of the table, may type on keyboard 300, while facing screen 110, without having to hold or even support cover 400 (and tablet 100).

As explained above, a user who has a mental image of the keyboards they use in everyday life (e.g. the virtual keyboard on their smartphone or the keyboard of their laptop) does not need to memorize the relative locations of the keys on keyboard 200 in order to type thereon. That is, the design of keyboard 200 is configured to facilitate use thereof by people who have formed a mental picture of the keyboards they use in everyday life. In contrast, some people do not form an accurate mental picture, or even a mental picture at all, of the keyboards they use in their mind but may nevertheless remember the locations of the keys due to tactile memory (in the sense of muscle memory). The tablet keyboard depicted in FIGS. 4A and 4B is configured to facilitate use thereof by people who have acquired muscle memory, which allows them to blind-type on the keyboards they use in everyday life.

Figure 4A:
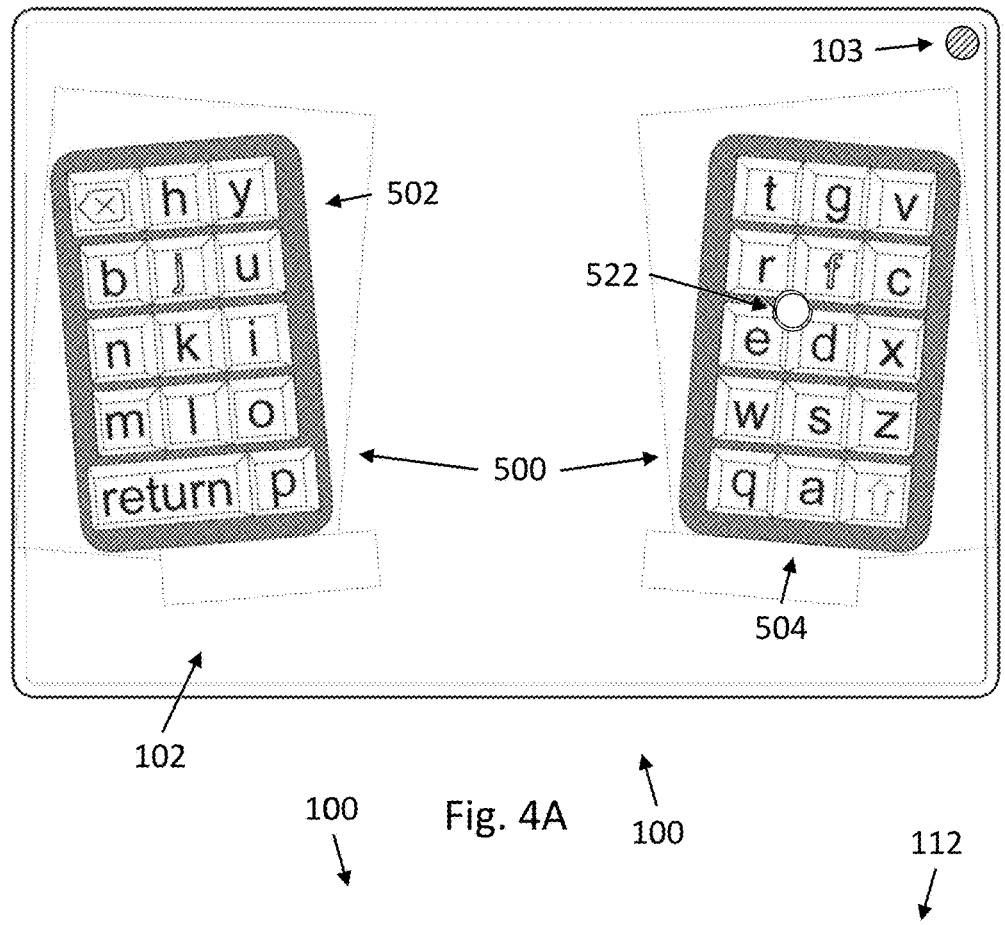
FIG. 4A presents a schematic back view of a tablet and a keyboard installed on the back of the tablet, according to some embodiments.
Figure 4B:
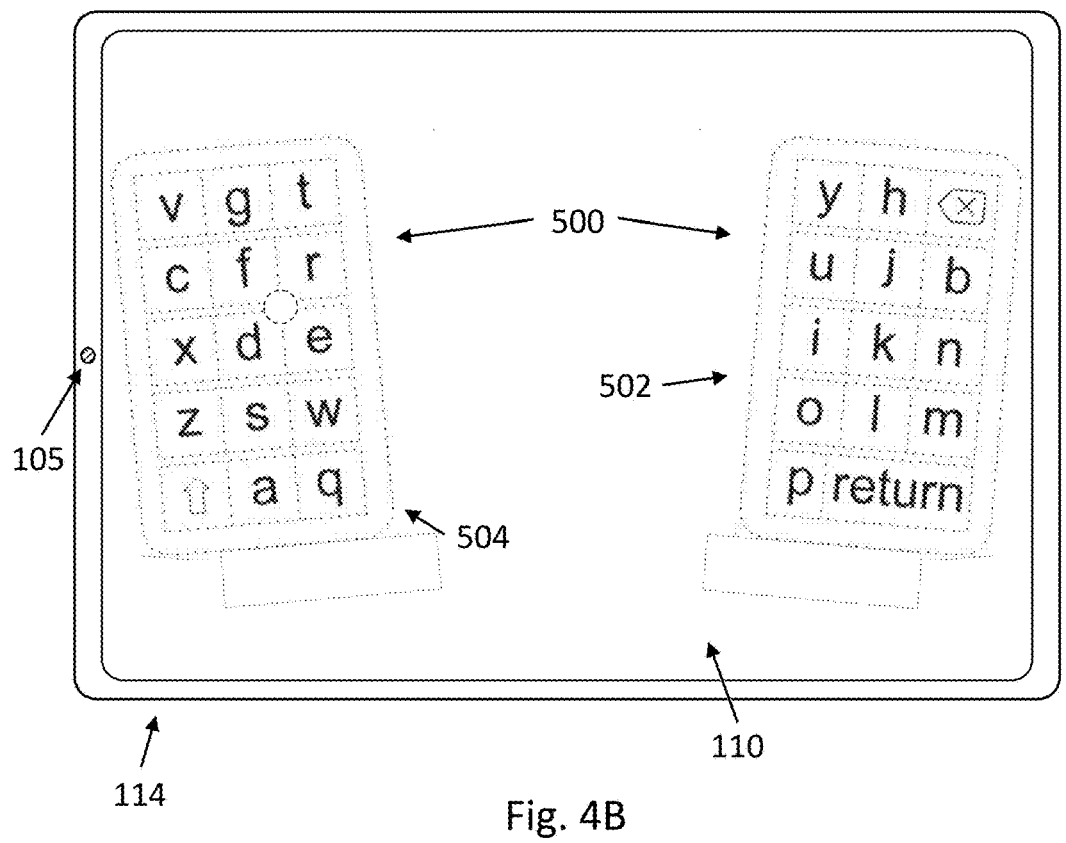
FIG. 4B presents a schematic front view of the tablet of FIG. 4A with the keyboard installed thereon, according to some embodiments. Being installed on the back of the tablet, the keyboard should not be visible in a front view but is nevertheless indicated (by a dashed outline) in order to facilitate the description.

Thus, according to an aspect of some embodiments, depicted in FIGS. 4A and 4B, there is provided a keyboard 500 for a tablet. FIG. 4A presents a schematical back view of tablet 100 with keyboard 500 mounted thereon, according to some embodiments. As a non-limiting example, keyboard 500 is shown as including a first unit 502 and a second unit 504 positioned on a left side and a back side, respectively, of back 102 (i.e. the backside of tablet 100). FIG. 4B presents a front view of tablet 100, according to some embodiments. Even though units 502 and 504 would not be visible to a user looking at screen 110 of tablet 100, they are nevertheless outlined (in a dashed line) to facilitate the description.

According to some embodiments, units 502 and 504 are attachable onto the backside of tablet 100 (e.g. using magnets), essentially as described with respect to units 202 and 204. Similarly to units 202 and 204, according to some embodiments, the precise positionings and orientations of units 502 and 504 on back 102 may be adjustable.

First unit 502 includes three columns of letters keys, which are arranged in a first pattern.

According to some embodiments, the first pattern may be obtained from the arrangement of letter keys on a right half of a standard computer keyboard (QWERTY in FIG. 4A) by a 90° (e.g. between 81° and 99° or even between 72° and 108°) clockwise rotation. Optionally, and as depicted in FIG. 4A, (following the rotation) the columns may be slightly vertically shifted with respect to one another, so as to afford a more compact layout of the keys. Second unit 504 includes three columns of letter keys, which are arranged in a second pattern. According to some embodiments, the second pattern may be obtained from the arrangement of letters keys on a left half of a standard computer keyboard (QWERTY in FIG. 4A) by a 90° (e.g. between 81° and 99° or even between 72° and 108°) anti-clockwise rotation. Optionally, and as depicted in FIG. 4A, (following the rotation) the columns may be slightly vertically shifted with respect to one another, so as to afford a more compact layout of the keys.

According to some embodiments, first unit 502 and/or second unit 504 may include a pointing stick (such as the pointing stick on Lenovo's ThinkPad models), which provides the same functionality as a computer mouse. As a non-limiting example, in FIG. 4A, second unit 504 is shown as including a pointing stick 522.

When each of first unit 502 and second unit 504 are properly positioned on the back of tablet 100, a user holding tablet 100—with screen 110 facing the user and such that the right hand and the left hand of the user grip a right side 112 and a left side 114, respectively, of tablet 100—will have the right hand fingers positioned on the keys of first unit 502, and the left hand fingers positioned on the keys of second unit 504. This positioning of the fingers on the keys is similar to the positioning of the fingers when typing on a laptop keyboard or desktop computer keyboard.

More specifically, according to some embodiments, in each hand the index finger will be positioned above the middle finger, which will be positioned above the ring finger, which will be positioned above the little finger. With the left hand so disposed, the left index figure may be positioned to allow striking: (i) when sufficiently extended, the keys T and 'r', substantially as is the case when typing on a standard (e.g. laptop or desktop) QWERTY keyboard; (ii) when slightly less extended, the keys 'g' and T, substantially as is the case when typing on a standard QWERTY keyboard; and (iii) when sufficiently retracted (or folded), the keys 'v' and 'c', substantially as is the case when typing on a standard QWERTY keyboard. Similarly, with the left hand so disposed, the left middle figure may be positioned to allow striking: (i) when sufficiently extended, the keys 'r' and 'e', substantially as is the case when typing on a standard QWERTY keyboard; (ii) when slightly less extended, the keys 'f' and 'd', substantially as is the case when typing on a standard QWERTY keyboard; and (iii) when sufficiently retracted (or folded), the keys 'c' and 'x', substantially as is the case when typing on a standard QWERTY keyboard, and so on with respect to the ring and little fingers. Similarly, with the right hand so disposed, the right index figure may be positioned to allow striking: (i) when sufficiently extended, the keys 'y' and 'u', substantially as is the case when typing on a standard (e.g. laptop or desktop) QWERTY keyboard; (ii) when slightly less extended, the keys 'h' and T, substantially as is the case when typing on a standard QWERTY keyboard; and (iii) when sufficiently retracted (or folded), the 'b' key, as when typing on a standard QWERTY keyboard, substantially as is the case when typing on a standard QWERTY keyboard, and so on with respect to the middle, ring, and little fingers.

In other words, when keyboard 500 is properly mounted on the back of a tablet, with the user holding the tablet as described above, each letter key on keyboard 500 is positioned where the user expects to find the key based on tactile memory from everyday use of a standard QWERTY keyboard.

According to some embodiments, a '123' key (to revert to a numbers and symbols keyboard layout) and a space key (not shown) may be included, for example, at the bottom of first unit 502 and second unit 504, respectively.

According to some embodiments, not depicted in FIGS. 4A and 4B, the number keys '6', '7', '8', '9', and '0' may be included in an additional rightmost column on first unit 502. Similarly, the number keys '1', '2', '3', '4', and '5' may be included in an additional leftmost column on second unit 504.

While keyboard 500 is shown as configured for users who in everyday life use a QWERTY keyboard, the scope of the disclosure covers substantially any type of keyboard, in any language, having the same dimensions as standard QWERTY keyboard and having a similar number of keys. Non-limiting examples include all the keyboards mentioned above in the discussion of the scope of the visual memory-based tablet keyboards.

Finally, it is noted that while keyboard 500 is shown as including two units (i.e. first unit 502 and second unit 504), according to some embodiments, the units may be connected so as to constitute a composite single unit.

Figure 5A:
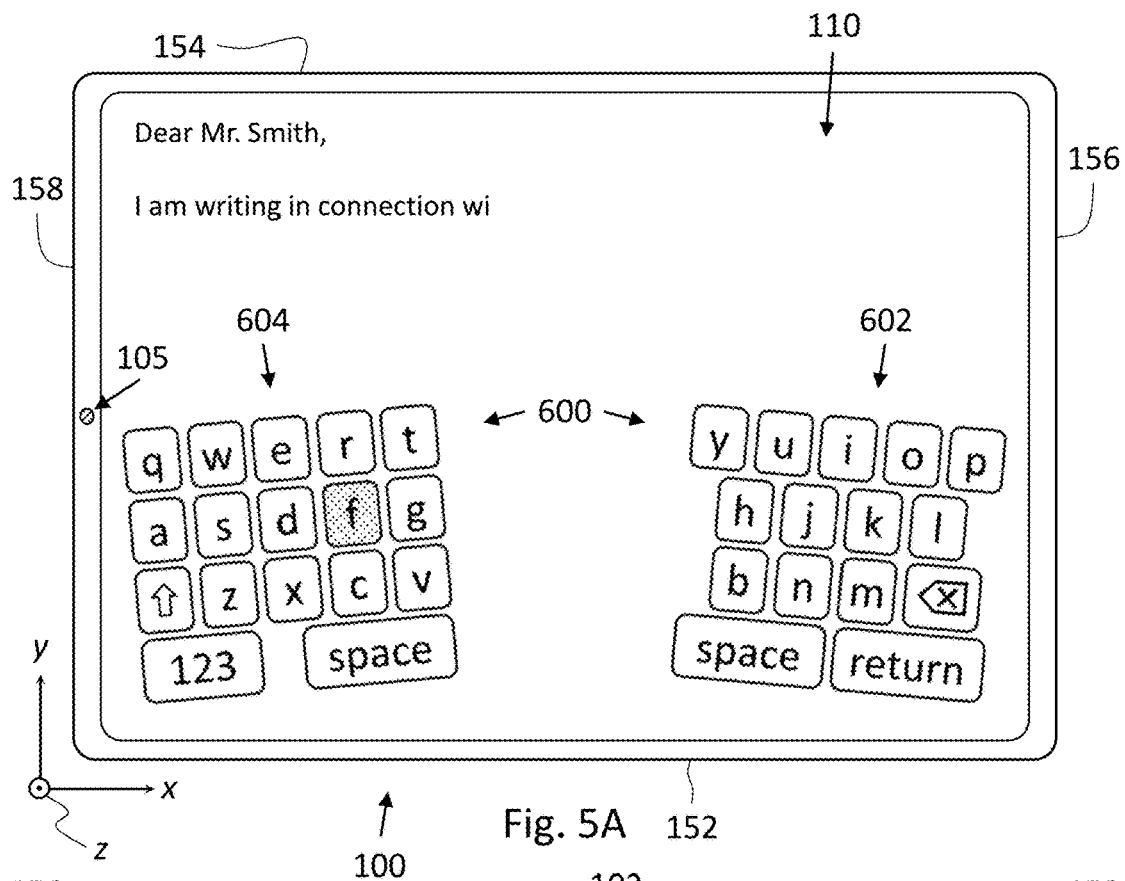
FIG. 5A presents a schematic front view of the tablet of FIG. 1A with a keyboard of installed on a back of the tablet, and with an actual size graphical representation of the keyboard being displayed on the screen of the tablet, such that the graphical representation is aligned with the (actual) keyboard, according to some embodiments.
Figure 5B:
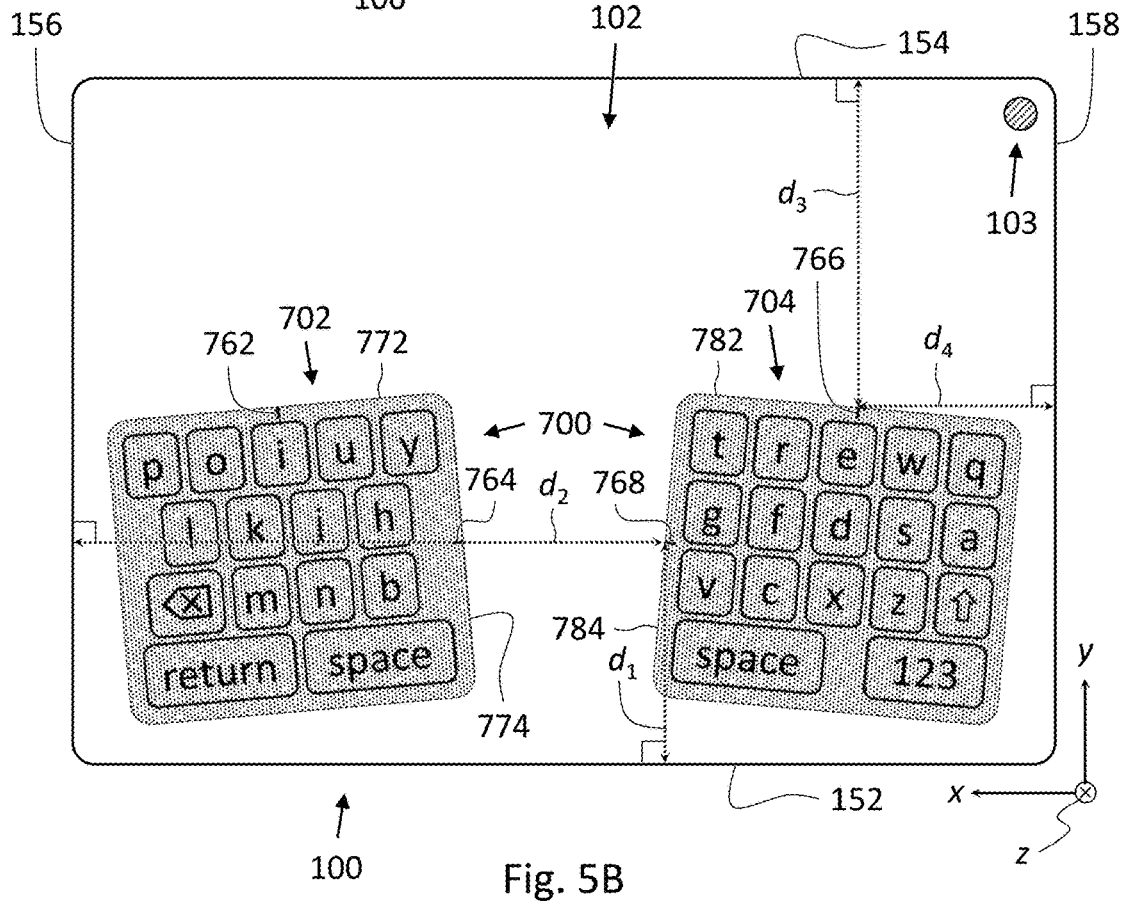
FIG. 5B presents a schematic back view of the tablet of FIG. 1A with the keyboard of FIG. 5A installed on the back thereof, according to some embodiments.

According to some embodiments, the disclosed keyboards may be used in conjunction with a keyboard-associated app (e.g. downloadable app to the tablet; also referred to as "app" for short), which is configured to provide a graphical representation of the keyboard on a screen of a tablet (e.g. screen 110 of tablet 100) (i) on which the keyboard is installed (on the back of the tablet), or (ii) which is inserted into a cover on which the keyboard is installed (on the back of the cover). The app, or at least the above-described feature, may be executed by a processor(s) (e.g. GPU) of the tablet. FIG. 5A schematically depicts a front view of tablet 100 with a keyboard installed thereon (being installed on back 102, the keyboard is not visible in FIG. 5A), and a graphical representation 600 of the keyboard, rendered by the app, displayed on screen 110, according to some embodiments. FIG. 5B schematically depicts a back view of tablet 100 with the keyboard—a keyboard 700—installed thereon (as in FIG. 5A). According to some embodiments, keyboard 700 may be similar keyboard 200 and includes a first unit 702 and a second unit 704, which may be similar to first unit 202 and second unit 204, respectively. As a non-limiting example, first unit 702 and second unit 704 are shown constituting complementary parts of a keyboard whose keys are arranged in a mirror image of a QWERTY keyboard, however, as the skilled person will readily appreciate, the keyboard-associated app may be used to provide a graphical representation of a tablet keyboard including any arrangement of keys.

Graphical representation 600 is actual size (i.e. 1:1 ratio) and is, moreover, aligned with keyboard 700, such that for each key, the graphical representation of the key is aligned with the (actual) key. That is, the graphical representation of a key is centered about the same lateral coordinates and occupies the same lateral area (or, put differently, has the same projection on the xy-plane) as the (actual) key, per the Cartesian coordinate system depicted in FIG. 5A and FIG. 5B. Graphical representation 600 effectively "renders visible" keyboard 700 to a user facing screen 110, and, as such, may facilitate blind-typing on keyboard 700, as described below.

More specifically, graphical representation 600 includes a first unit graphical representation 602 of first unit 702 and a second unit graphical representation 604 of second unit 704. Each of graphical representations 602 and 604 is actual size and is, moreover, aligned with first unit 702 and second unit 704, respectively.

As a non-limiting example, keyboard 700 is shown installed on a bottom half of back 102. Accordingly, graphical representation 600 is rendered on a bottom part of screen 110, leaving room (as shown in FIG. 5A) for text to be typed on screen 110 above graphical representation 600.

While FIGS. 5A and 5B illustrate the case wherein a graphical representation of a keyboard, which is installed on the back of tablet, is provided, the skilled person will readily appreciate the generalization to the provision of a graphical representation of a keyboard on the screen of a tablet, which is inserted into a cover for tablet, which, in turn, has the keyboard mounted on the back of the cover. The graphical representation is actual size and (laterally) aligned with the keyboard on the back of the cover.

According to some embodiments, each of first unit 702 and second unit 704 includes (visual) markings. As a non-limiting example, according to some embodiments, first unit 702 is shown as including two markings: a first marking 762 and a second marking 764. According to some embodiments, second unit 704 is shown as including two markings: a third marking 766 and a fourth marking 768, In FIG. 5B, the markings are shown as positioned midway along of the edges of first unit 702 and second unit 704, but the skilled person will readily perceive that other positionings are equally applicable. More specifically, first marking 762 and second marking 764 are shown positioned midway along a top edge 772 and a side-edge 774 of first unit 702. Third marking 766 and fourth marking 768 are shown positioned midway along a top edge 782 and a side-edge 784 (adjacent to side-edge 774) of second unit 704.

Indicated are a bottom edge 152, a top edge 154, a first side-edge 156, and a second side-edge 158 (opposite to first side-edge 156) of tablet 100. Also indicated is a distance $d_1$ from bottom edge 152 to fourth marking 768 (on second unit 704), a distance $d_2$ from first side-edge 156 to fourth marking 768, a distance $d_3$ from top edge 154 to third marking 766 (on second unit 704), and a distance $d_4$ from second side-edge 158 to third marking 766. The distances $d_1$ to $d_4$ may be measured using, for example, a camera of a mobile computational device (e.g. a smartphone), which has installed thereon a digital ruler app, such as one of the digital ruler apps available for iPhone (e.g. the Measure app) or Android phones. Additionally, or alternatively, according to some embodiments, the distances $d_1$ to $d_4$ may be measured using an (actual) ruler.

According to some embodiments, the app is configured to receive values (e.g. measured values) of distances between the keyboard and edges and/or corners of the tablet, and, based thereon, position and orient the graphical representation of the keyboard on the screen of the tablet, such that the graphical representation is (laterally) aligned with the keyboard. According to some such embodiments, the app may be configured to receive values of distances from the edges of the tablet to each of a plurality of markings on the keyboard. For example, according to some embodiments, the keyboard-associated app may be configured to position and orient (on screen) the graphical representation of second unit 704 (i.e. second unit graphical representation 604), based on, for example, the values of (at least three of) the distances $d_1$ to $d_4$. Similarly, according to some embodiments, the keyboard-associated app may be configured to position and orient (on screen) the graphical representation of first unit 702 (i.e. first unit graphical representation 602), based on, for example, the values of (at least three of) the distances from each of bottom edge 152 and first side-edge 156 to second marking 764, and from each of top edge 154 and second side-edge 158 to first marking 762.

Additionally, or alternatively, according to some embodiments, the keyboard-associated app may include an image recognition algorithm (e.g. a neural net). The image recognition algorithm may be configured to receive as input one or more photos (e.g. taken using a digital camera or a smartphone) of a tablet with the keyboard mounted thereon, and to output the corresponding positions and orientations of keyboard on the back of the tablet, based on which the keyboard-associated app renders the graphical representation of the keyboard. According to some embodiments, the image recognition algorithm is further configured to receive an additional input specifying the lateral dimensions of the tablet (the dimensions of the keyboard are assumed to be prespecified). Alternatively, instead of directly specifying the lateral dimensions, the additional input may specify the model (e.g. iPad Air: 5th generation).

According to some embodiments, the image recognition algorithm will have been trained (e.g. using supervised training) to correlate between (i) an input set of photos of the backs of tablets with the keyboard mounted thereon at different combinations of positions and orientations, (ii) and an output set specifying the corresponding positions and orientations of the keyboard on the back of the tablets (which may be measured as described above). According to some embodiments, wherein the keyboard exists in a number of models differing from one another in the dimensions thereof, parameters of the image recognition algorithm (e.g. the weights of the neural net) may depend on the dimensions of the model, or, put differently, to each model there will correspond a different image recognition algorithm.

According to some embodiments, the image recognition algorithm may be implemented in the cloud (e.g. by a cloud server).

While the above methods for positioning and orientating the graphical representation were described with respect to the mounting of the keyboard on the back of a tablet, the skilled person will readily appreciate their applicability also with respect to the mounting of the keyboard on the back of a cover for a tablet with a tablet inserted thereinto (so that, for example, instead of taking photos of the keyboard mounted on the back of the tablet, photos are taken of the keyboard mounted on the back of the cover).

According to some embodiments, the app is configured to highlight the graphical representation of a key when the key is pressed. For example, in FIG. 5A the graphical representation of the 'f' key is highlighted due to the 'f' key being pressed (FIG. 5A does not show the user pressing the key is not shown). The visual feedback provided by the highlighting of pressed keys may facilitate learning how to blind-type on keyboard 200, and, more generally, on any keyboard, which is configured to be mounted on the back of a tablet or on the back of a cover for a tablet, with any arrangement of keys, even a different arrangement of keys than that which the user is accustomed to (e.g. from using a laptop or a desktop computer). The scope of the disclosure thus encompasses any keyboard which is mounted, or may be mounted, on the back of a tablet or a cover of a tablet, so as to allow typing thereon while holding the tablet (or the cover with the tablet inserted into the cover) such that the screen of the tablet faces the user, especially, when employed with the above-described app. In particular, it is to be understood that the disclosed tablet keyboards are not limited to tablet keyboards having a key arrangement, such as the key arrangements depicted in the FIGS. 1A, 3A, and 4A, which facilitate blind-typing on the tablet keyboard based on visual memory of a standard computer keyboard or a virtual tablet keyboard, or tactile memory of a standard computer keyboard.

According to some embodiments, not depicted in FIG. 7B, keyboard 700 may further include a touch surface and/or a pointing stick providing mouse-like functionality.

As non-limiting examples, the Figures depict the mounting of keyboard units on the backs of tablets so as to facilitate typing in landscape mode. Nevertheless, it is to be understood that the scope of the disclosure also covers tablet keyboards, which are suited, or additionally suited, to be mounted on the backs of tablets so as to facilitate typing in portrait mode. In particular, according to some embodiments thereof, keyboard 200 may be configured (e.g. dimensioned) to be mounted on the back of a tablet so as to facilitate typing in portrait mode.

The skilled person will appreciate that the disclosed technology is readily adaptable for use with smartphones. More specifically, keyboards with layouts as disclosed herein may be installed on the back of larger smartphones, which may have screens measuring over 6.5 inches. Further, the scope of the present disclosure is to be understood as encompassing keyboard systems for smartphones, which include a keyboard mountable on the back of a smartphone and an app, which is to be used and conjunction therewith, and configured to provide an actual size graphical representation of the keyboard on the screen of the smartphone. Finally, the scope of the disclosure is to be understood as also encompassing numeric keypads, which are mountable on the back of a smartphone, particularly, when used in conjunction with an app configured to provide an actual size graphical representation of keypad on the screen of the smartphone.

The term "keyboard", when employed in reference to a keyboard for a tablet, is used interchangeably with the term "tablet keyboard". The terms "cover" and "case"—when employed to describe an external, protective casing into which a tablet may be removably inserted—are interchangeable. The terms "unit" and "part", when employed in reference to tablet keyboards, as disclosed herein, may be used interchangeably.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although the disclosure is described in conjunction with specific embodiments thereof, it is evident that numerous alternatives, modifications and variations that are apparent to those skilled in the art may exist. Accordingly, the disclosure embraces all such alternatives, modifications and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purposes and should not be regarded as limiting. Citation or identification of any reference in this application shall not be construed as an admission that such reference is available as prior art to the disclosure. Section headings are used herein to ease understanding of the specification and should not be construed as necessarily limiting.

What is claimed is:

1. A keyboard for a tablet, the keyboard being functionally associable with the tablet and being mounted, or mountable, on a back of a tablet, and/or on a back of a cover for tablet, so as to enable a user, who holds the tablet or the cover with both hands and faces a screen of the tablet, to use a right hand to type on a first part of the keyboard and a left hand to type on a second part of the keyboard; and
wherein the first part and the second part constitute complementary parts of a keyboard whose keys are arranged in a mirror image of a standard computer keyboard or virtual smartphone keyboard;
the keyboard being thereby configured to facilitate blind typing thereon.

2. The keyboard of claim 1, wherein the first part and the second part constitute complementary parts of a keyboard whose keys are arranged in a mirror image of a QWERTY keyboard; or
wherein the first part is positioned and configured to enable the user to type thereon using one or more of the second to fifth digits of the right hand, and wherein the second part is positioned and configured to enable the driver to type thereon using one or more of the second to fifth digits of the left hand.

3. The keyboard of claim 1, wherein the first part and the second part constitute two separate, and separately mountable, units.

4. The keyboard of claim 1, wherein one or more letter keys on each of the first part and the second part have imprinted thereon a raised impression of the respective letter, thereby facilitating tactile identification of the letter key.

5. The keyboard of claim 1, further comprising a wireless communication unit configured to communicate to the tablet when a key on the keyboard is pressed.

6. The keyboard of claim 1, wherein the first part is or comprises a touch surface and/or the second part is or comprises a touch surface.

7. The keyboard of claim 1, configured to be removably mountable on the back of the tablet and/or on the back of the cover for the tablet; or
built-in into the back of the tablet or built-in to the back of the cover for the tablet.

8. A keyboard system for a tablet, the keyboard system comprising:
a keyboard mounted, or mountable, on a back of a tablet and/or on a back for a cover for a tablet; and
a processor(s) configured to, when the keyboard is mounted on the back of the tablet or on the back of the cover for the tablet with the tablet inserted into the cover, have the tablet to display on a screen thereof a graphical representation of the keyboard, which is about actual size and about aligned with the keyboard;
wherein the processor(s) is configured to receive values of distances between the keyboard and edges and/or corners of the tablet, or the cover, and, based thereon, position and orient the graphical representation of the keyboard on the screen of the tablet, such that the graphical representation is aligned with the keyboard or wherein the processor(s) is configured to (i) receive one or more photos of the back of the tablet with the keyboard mounted thereon, or the back of the cover with the tablet inserted thereinto and the keyboard mounted thereon, and (ii) position and orient the graphical representation of the keyboard on the screen of the tablet, such that the graphical representation is aligned with the keyboard, by executing an image recognition algorithm.

9. The keyboard system of claim 8, wherein the processor(s) is further configured to, when a key on the keyboard is pressed, have a graphical representation of the key highlighted.

10. The keyboard system of claim 8, wherein the keyboard comprises a plurality of visual markings, and wherein the processor(s) is configured to receive values of distances from the edges of the tablet, or the cover, to the visual markings, and, based thereon, position and orient the graphical representation of the keyboard on the screen of the tablet, such that the graphical representation is aligned with the keyboard.

11. The keyboard system of claim 8, wherein the processor(s) is included in the tablet.

12. The keyboard system of claim 8, wherein the keyboard is configured so as to enable a user, who holds the tablet or the cover with both hands and faces a screen of the tablet, to use a right hand to type on a first part of the keyboard and a left hand to type on a second part of the keyboard.

13. The keyboard system of claim 12, wherein the first part and the second part constitute complementary parts of a keyboard whose keys are arranged in a mirror image of a standard computer keyboard or virtual smartphone keyboard; or
wherein the first part comprises three columns of letters keys arranged in a first pattern, which is related to the arrangement of letter keys on a right half of a standard computer keyboard by about 90° clockwise rotation, and the second part comprises three columns of letter keys arranged in a second pattern, which is related to the arrangement of letters keys on a left half of a standard computer keyboard by about 90° anti-clockwise rotation.

14. The keyboard system of claim 12, wherein the first part and the second part constitute two separate, and separately mountable, units.

15. The keyboard system of claim 8, wherein the keyboard is configured to be removably mountable on the back of the tablet and/or on the back of the cover for the tablet; or
wherein the keyboard is built-in into the back of the tablet or wherein the keyboard is built-in to the back of the cover for the tablet.

16. A computer-readable statutory storage medium having stored thereon software instructions executable by a processor(s) of a tablet that cause the tablet, which is in communication with a keyboard mounted on a back of the tablet or on a back of a cover for the tablet with the tablet inserted into the cover, to display on a screen of the tablet a graphical representation of the keyboard, which is actual size and is aligned with the keyboard;
wherein the software instructions further cause the processor(s) on receipt of values, specifying distances from edges of the tablet, or the cover, to predetermined locations on the keyboard, position and orient the graphical representation of the keyboard on the screen of the tablet, such that the graphical representation is aligned with the keyboard, based on the received values; or wherein the software instructions further cause the processor(s) on receipt of one or more photos of the back of the tablet with the keyboard mounted thereon, or the back of the cover with the tablet inserted thereinto and the keyboard mounted thereon, to position and orient the graphical representation of the keyboard on the screen of the tablet, such that the graphical representation is aligned with the keyboard, by executing an image recognition algorithm.

17. The storage medium of claim 16, wherein the software instructions further cause the tablet, when a key on the keyboard is pressed, to highlight a graphical representation of the key.

* * * * *